(12) United States Patent  
Lund

(10) Patent No.: US 7,571,223 B2  
(45) Date of Patent: Aug. 4, 2009

(54) SYSTEM, METHOD AND PROGRAM PRODUCT FOR PROGRAMMING A COMPUTER ON A NETWORK TO PERFORM A SERVICE

(75) Inventor: Arnaud Lund, Cagnes-sur-mer (FR)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 11/089,166

(22) Filed: Mar. 24, 2005

(65) Prior Publication Data

US 2005/0213588 A1    Sep. 29, 2005

(30) Foreign Application Priority Data

Mar. 25, 2004   (EP)   ................... 04368021

(51) Int. Cl.
*G06F 15/177* (2006.01)
(52) U.S. Cl. ...................... 709/220; 709/221
(58) Field of Classification Search ................ 709/220; 370/397
See application file for complete search history.

(56) References Cited

U.S. PATENT DOCUMENTS 5,394,402 A * 2/1995 Ross .................... 370/402
6,289,378 B1 * 9/2001 Meyer et al. ................ 709/223
6,775,290 B1 * 8/2004 Merchant et al. ....... 370/395.53
7,099,285 B1 * 8/2006 Kanuri et al. ................ 370/254
2001/0005369 A1 * 6/2001 Kloth ........................ 370/392
2002/0156874 A1 * 10/2002 Suorsa et al. ............... 709/220
2003/0120853 A1 * 6/2003 Rankin et al. ............... 710/316

* cited by examiner

*Primary Examiner*—Larry D Donaghue
*Assistant Examiner*—Ryan J Jakovac
(74) *Attorney, Agent, or Firm*—Arthur Samodovitz; Karuna Ojanen; Hamre, Schumann, Mueller & Larson, P.C.

(57) ABSTRACT

System, method and program product for programming an application computer accessible to a user via a first network to perform a service for the user. The application computer, a program code server, a management computer and the first network are connected to a multiport switch. The management computer directs the switch to form a first VLAN to connect the management computer to the application computer. The management computer configures the application computer via the first VLAN to receive an application program to perform the service for the user. The management computer directs the switch to form a second VLAN to connect the code server to the application computer. The code server downloads the application program to the application computer via the second VLAN. The application computer is connected to the first network via a third VLAN of the switch to provide the service of the application program for the user via the first network.

17 Claims, 7 Drawing Sheets

SYSTEM, METHOD AND PROGRAM PRODUCT FOR PROGRAMMING A COMPUTER ON A NETWORK TO PERFORM A SERVICE

BACKGROUND OF THE INVENTION

The invention relates generally to networks with application computers or servers, and more particularly to automatic programming of the application computers or servers to perform corresponding services to users via the network.

An IP network such as the Internet network conforms to a TCP/IP protocol suite for interconnecting a number of other IP networks. TCP is a transport layer protocol providing end-to-end data transfer. IP is an internetwork layer protocol hiding the physical network architecture to form what appears to the user to be only one large network. In an IP network, two computers can either be directly or indirectly connected together. A physical link can provide a direct connection between a pair of computers. Two or more computers can be connected through a switch on a single physical cable. The physical cable can be connected to a switch port, such that the computers are associated with the switch port.

A Virtual Local Area Network (VLAN) is known. A VLAN can be formed from a multiport switch having a multiplicity of internal switch elements such as transistors. By controlling the internal switches, the external computers connected to the switch can be interconnected. The external computers which are all interconnected by the switch elements to communicate with each other are considered to reside on the same VLAN. In such an implementation, a management computer controls the virtual connection (or disconnection) of several computer using switch configuration commands and without manual intervention. The switch is configured in such a way that only selected switch ports are connected together.

Even though it is possible to build VLANs including computers which can be changed over time, each of the computers has a specific function within the network. If the workload increases, the computers can be reconfigured, but this may be a long and tedious process requiring manual intervention. This limits the adaptability of the network when the demand varies.

Some existing technologies such as grid computing share processing over a pool of computers. The workload is divided into separate units which can be processed independently by separate computers. Each computer sends back the result of its computation when it is finished. The sharing of the physical resources and its split between the different computers that participate to the grid is seamless to the user. Should the user's need for computing power increase, the system will adapt by sending work to more computers. Conversely, when the need for processing power decreases, the computers can be used for other purposes. The system is therefore flexible and adaptive because it is able to automatically adjust to users' needs. However, processing power is only a part of the problem that the users face. Indeed, the system's adaptability is limited by the established framework of the network. Thus, when a new processor is assigned to some task to share the load of an overloaded processor, the new processor is added to the existing one, and the network keeps the same basic structure. However, the need for adaptation may also involve the rework of the network structure in terms of the functions that perform the various network elements.

An object of the present invention is to facilitate the change of function provided by computers on a network.

SUMMARY OF THE INVENTION

The present invention resides in a system, method and program product for programming an application computer accessible to a user via a first network to perform a service for the user. The application computer, a program code server, a management computer and the first network are connected to a multiport switch. The management computer directs the switch to form a first VLAN to connect the management computer to the application computer. The management computer configures the application computer via the first VLAN to receive an application program to perform the service for the user. The management computer directs the switch to form a second VLAN to connect the code server to the application computer. The code server downloads the application program to the application computer via the second VLAN. The application computer is connected to the first network via a third VLAN of the switch to provide the service of the application program for the user via the first network.

DETAILED DESCRIPTION OF THE PREFERRED EMBODIMENTS

Figure 1:
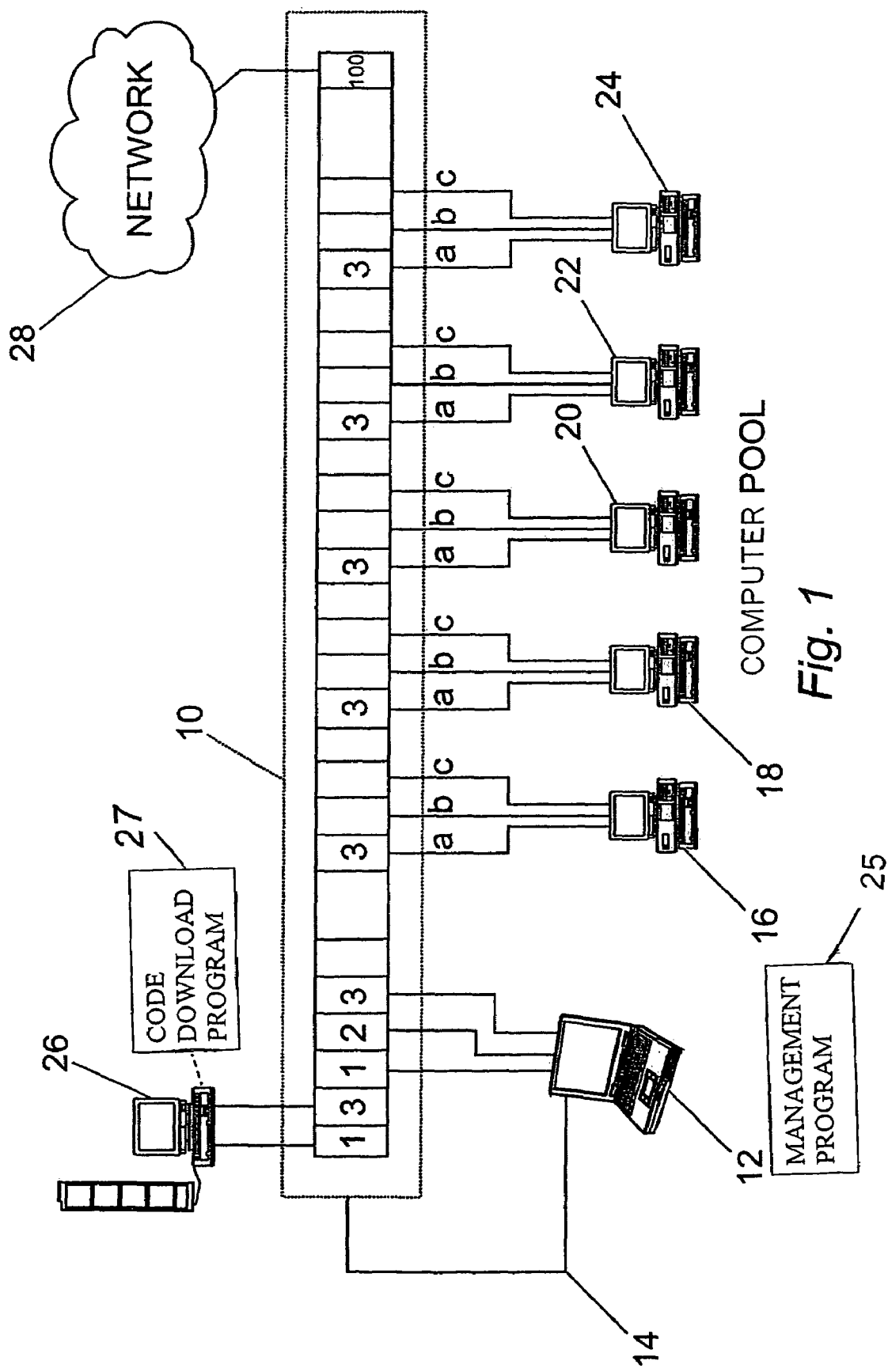
FIG. 1 is a schematic representation of a system including a VLAN switch, a management computer, a program code server and a pool of function-assignable computers in accordance with the present invention.

The present invention will now be described in detail with reference to the figures. FIG. 1 illustrates a distributed computer system comprising a switch 10 managed by a management computer 12 via a control line 14. Management computer 12 controls switch 10 to form VLANs as described below. Switch 10 is connected to a network 28 such as the Internet by a pre-assigned port on the switch. Five computers 16, 18, 20, 22, 24 of a computer pool are also connected to pre-assigned ports of the switch 10. In the illustrated embodiment, each computer is connected to three ports referenced as "a", "b", and "c". However, in another embodiments of the present invention, each computer is connected to the switch by two ports.

A management program 25 within management computer 12 directs switch 10 to form a "management" VLAN 3 to connect the management computer 12 to the first ports "a" of the switch for all the computers. Consequently, the management computer 12 can control and configure each of the computers 16, 18, 20, 22 and 24 via VLAN 3, as described in more detail below.

A code server 26 is connected to the switch's "management" VLAN 3 and also the switch's "download" VLAN 1. The management computer 12 is also connected to VLAN 1 to control the code server. The code server, including a code download program 27, uses VLAN 1 to download a computer program code to an application computer 16, 18, 20, or 22 as described in more detail below.

Figure 3:
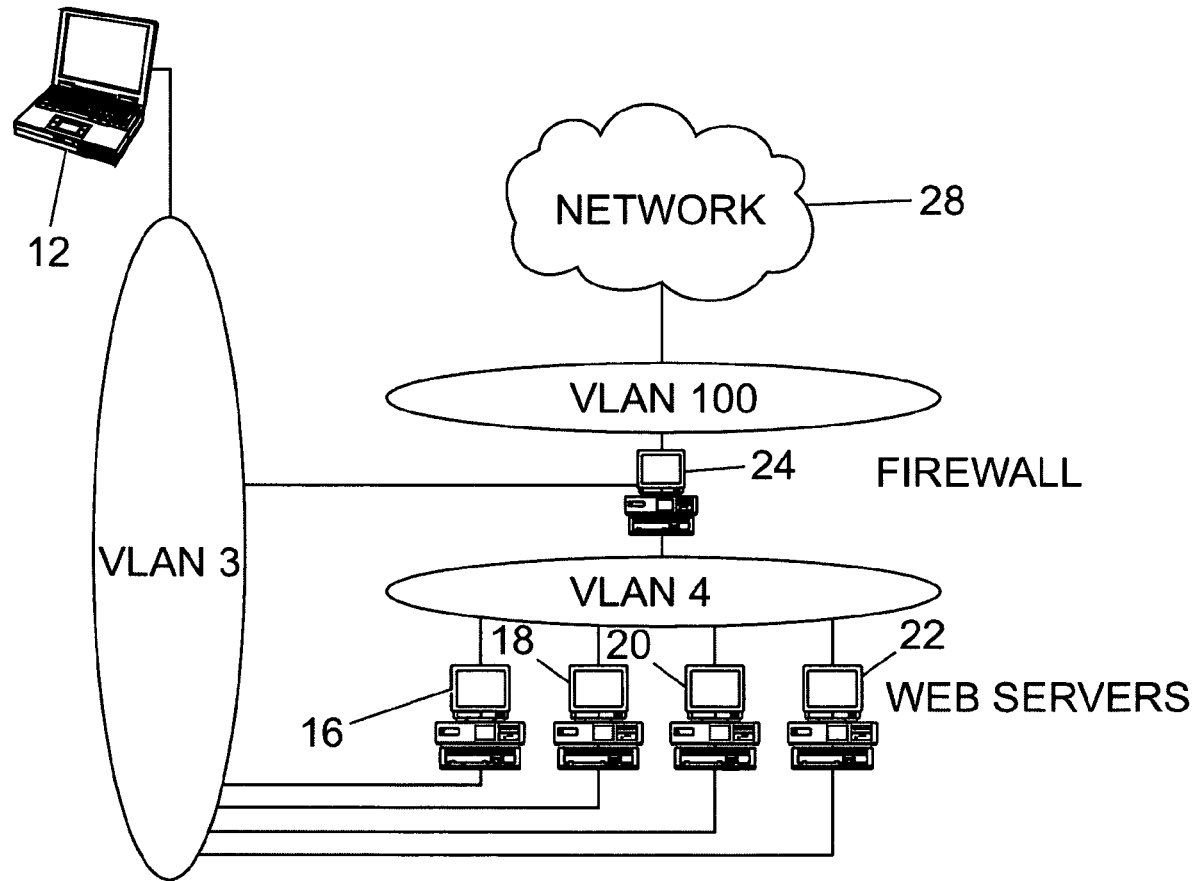
FIG. 3 is a logical representation of one state of the system illustrated in FIG. 2, including VLANs formed from the switch.

The management program 25 within management computer 12 also directs switch 10 to form a VLAN 100 to connect to network 28. Optionally (as illustrated in FIG. 3), computer 24 is configured and programmed as a firewall, is connected to network 28 via VLAN 100 and is connected to application computers 16, 18, 20 and 22 via a VLAN 4. Management computer 12 also formed VLAN 4. Thus, a user on network 28 can access the application computers 16, 18, 20 and 22 via VLAN 100, firewall 24 and VLAN 4.

Figure 2:
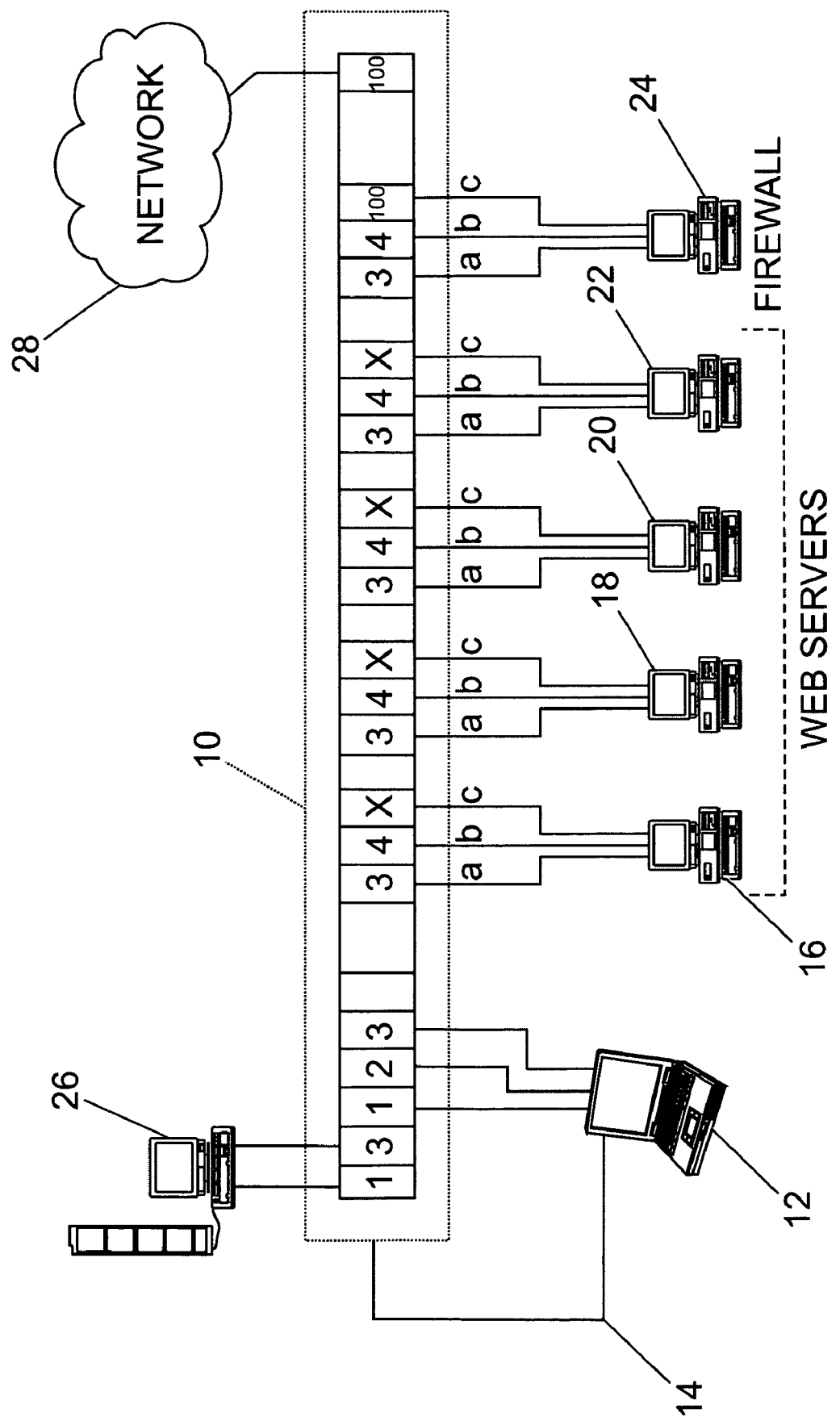
FIG. 2 is a schematic representation of the system illustrated in FIG. 1 wherein some of the function-assignable computers are configured as web servers, and one of the function-assignable computers is configured as a firewall.

In the embodiment illustrated in FIG. 2, computers 16, 18, 20, 22 are web servers (although they could be other types of computers as well), and computer 24 is a firewall for those computers. Each computer is configured separately. Each computer 16, 18, 20 or 24 can be configured into a web server as follows, where changes in the connections of the computers to the switch are made by management computer 12 via line 14. The following describes the configuration and programming of computer 16 as a web server.

(i) Management program 25 within management computer 12 disables ports "b" and "c" on the switch connected to the computer 16 so that computer 16 is only connected to the switch by port "a".

(ii) Management program 25 within management computer 12 assigns the port "a" of computer 16 to VLAN 2 so that computer 16 is now isolated from the other VLANs. (No other computer 18, 20, 22, 24 or 26 is now connected to VLAN 2.) Because management computer 12 is the only one having an interface on VLAN 2, it can take control of computer 16.

(iii) Management program 25 within management computer 12 then directs, via VLAN 2, rebooting of computer 16 such that bootstrap program code in computer 16 is executed. The bootstrap code configures the IP address of a port of computer 16 with a predefined value and periodically attempts to connect to the code server 26 using the IP address of the code server.

(iv) Next, management program 25 with management computer 12 assigns port "a" to VLAN 1 to enable code server 26 to download program code to application computer 16 via VLAN 1. Accordingly, application computer 16 and code server 26 are connected to VLAN 1. At the same time, management computer 12 takes control of the code server 26 through VLAN 3.

(v) Management program 25 within management server 12 selects the application program code on code server 26 to download to application computer 16. For example, the application computer code is a web server image, and the management computer 12 initiates a server download program within code server 26 to download a copy of the application program to computer 16 via VLAN 1.

(vi) After completion of the download, the port "a" of computer 16 is assigned to VLAN 2 again. Computer 16 is now isolated on VLAN 2 only accessible by management computer 12. Management program 25 within management computer 12 then completes the configuration of computer 16 (e.g. all interfaces are given their final IP addresses).

(vii) After completion of the configuration of computer 16, the port "a" of computer 16 is assigned to management VLAN 3, the port "b" of the computer is assigned to VLAN 4 and the port "c" remains unassigned so that the new web server is placed in the appropriate position in the final network structure.

The foregoing steps (i-vii) are then repeated for computers 18, 20, 22 so that computers 16, 18, 20 and 22 are configured as web servers at the completion of the procedure as illustrated in FIG. 2. The foregoing steps (i-vii) are also repeated for computer 24. In this case, the selected code image to be downloaded from code server 26 to computer 24 is the firewall code. Also, in step (vii), the port "c" is assigned to VLAN 100 which is the VLAN enabling the new firewall to be connected to the network 28. FIG. 3 illustrates the final architecture. Note that each of the computers 16, 18, 20 and 22, which are now web servers, are connected to two VLANs, i.e. VLANs 3 and 4. However, if desired, each of the web servers could be connected to more than two VLANs.

Figure 4:
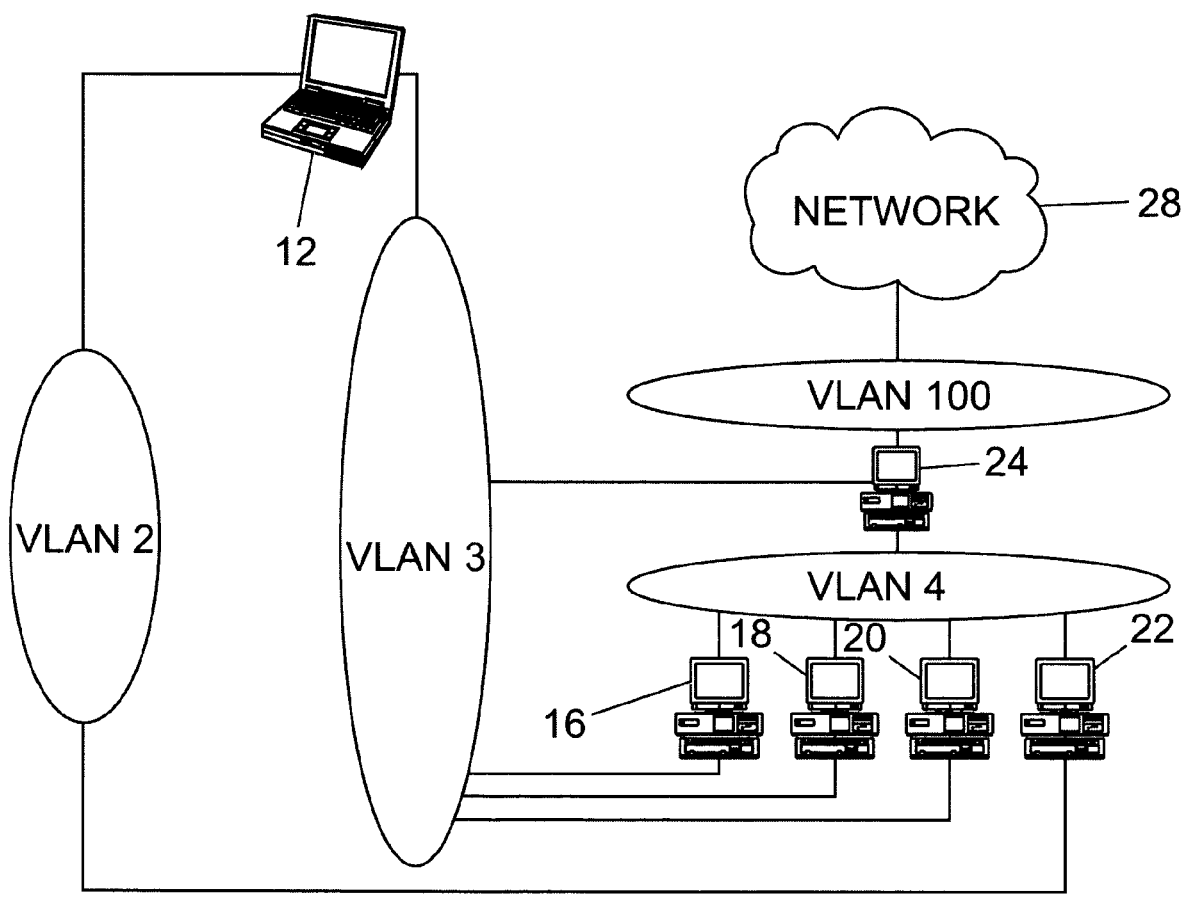
FIG. 4 is a logical representation of another state of the system illustrated in FIG. 2, where a management computer has formed a VLAN through which to configure an application computer.
Figure 5:
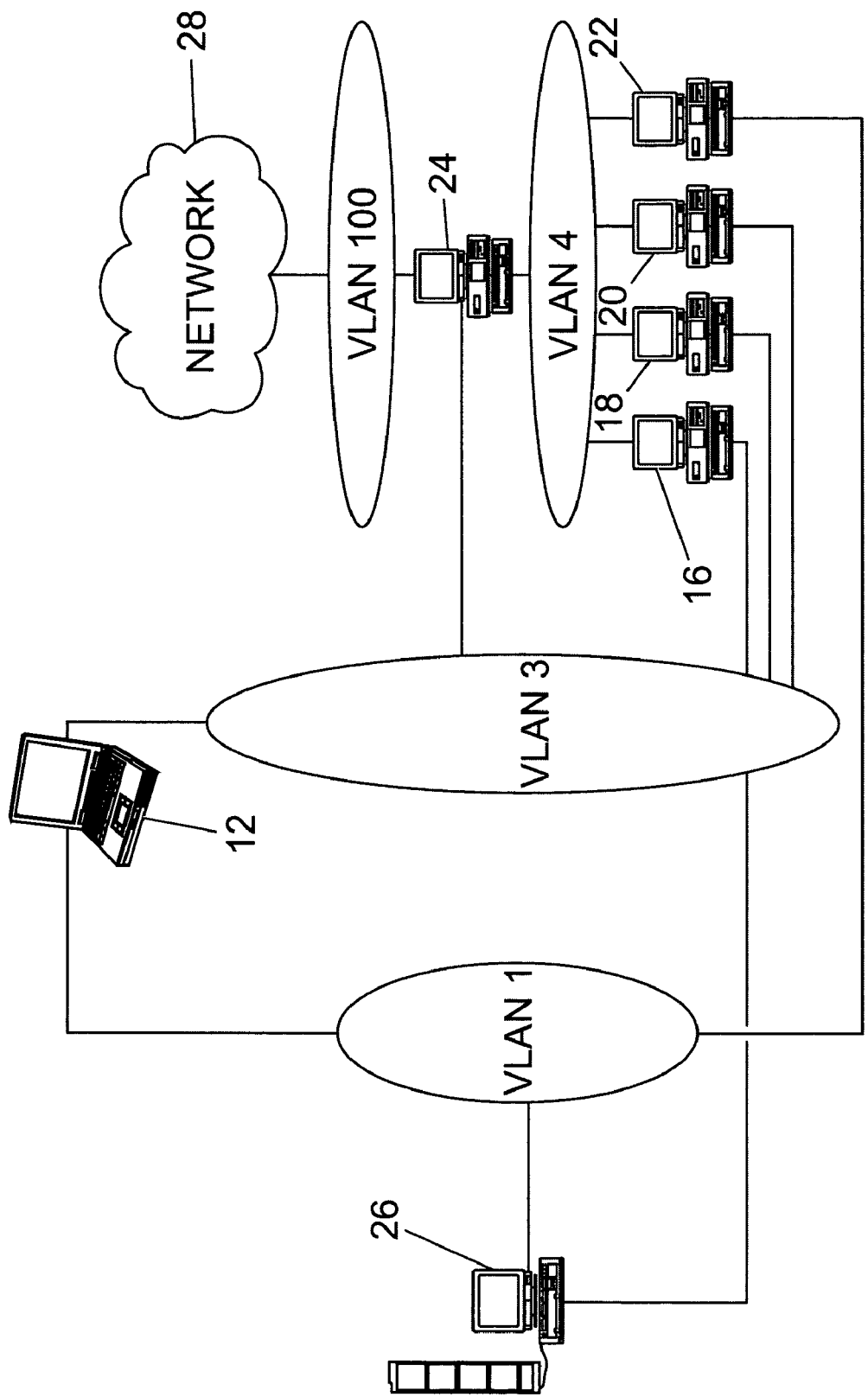
FIG. 5 is a logical representation of another state of the system of FIG. 3, wherein the management computer has formed another VLAN through which a code server can download a computer application program for the new function.

Consider next what happens when it is necessary to update the network configuration. For example, each web server is currently running its own local database. But, for efficiency and consistency, it becomes necessary to use a single database located in a unique database server. The goal of the transformation will be to convert one of the web servers 16, 18, 20 or 22 into a database server and to connect it to the remaining web servers. Computer 22 is selected to be transformed into the new database server. The procedure described above in steps (i-vii) is used to perform this transformation. Thus, in step (ii), the port "a" of computer 22 is assigned to VLAN 2 as illustrated in FIG. 4. Because management computer 12 interfaces also with VLAN 2, management computer 12 can take control of computer 22 to configure it. In step (iv), port "a" of computer 22 is assigned so that the database code image can be downloaded from code server 26 via VLAN 1 to computer 22 under the control of management computer 12. Code server 26 is connected to VLAN 3 to the manage VLAN 3. This is illustrated in FIG. 5.

Figure 6:
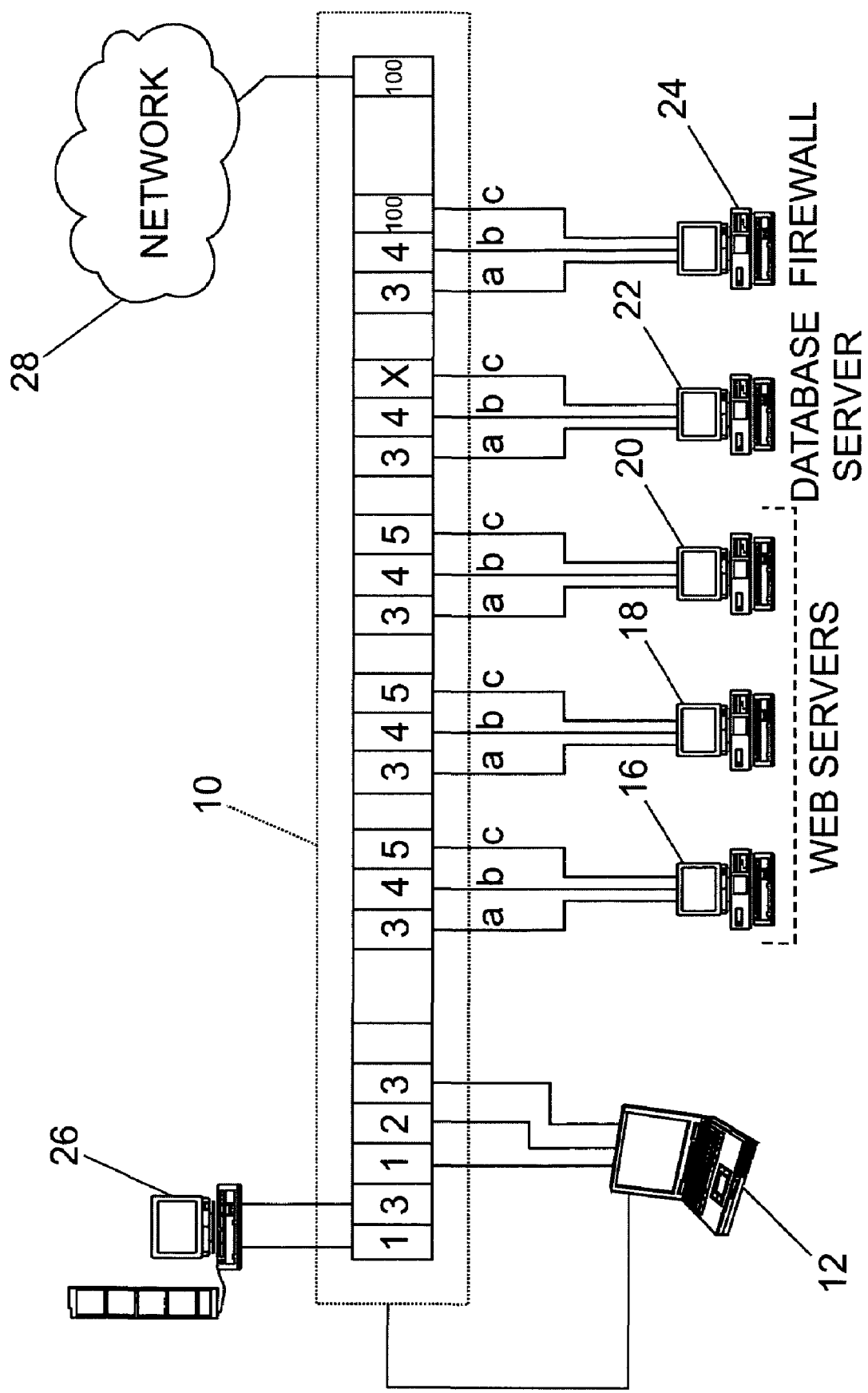
FIG. 6 is a schematic representation of the new system after the application computer has been programmed with the computer application program to perform the new function of a database server.
Figure 7:
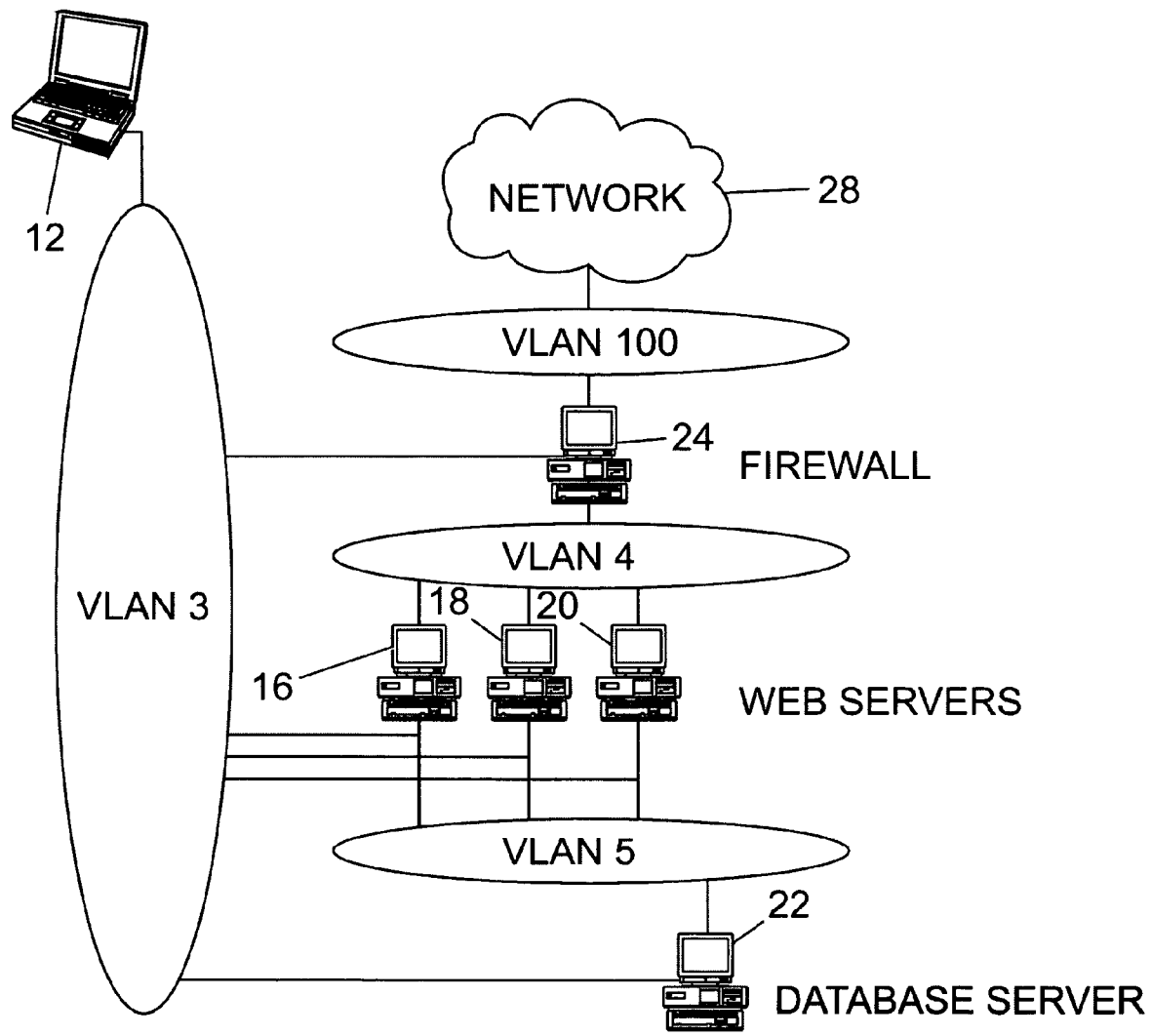
FIG. 7 is a logical representation of the system illustrated in FIG. 6, including VLANs formed from the switch.

When the database code image has been downloaded to computer 22, computer 22 is again assigned to VLAN 2 (not shown) so that the configuration of computer 22 can be completed as explained in step (vi). Finally, port "a" of the computer is assigned to management VLAN 3, port "b" is assigned to VLAN 4, and port "c" remains unassigned as shown in the schematic representation illustrated in FIG. 6. The logical representation of the final architecture is illustrated in FIG. 7. The web servers 16, 18 and 20 and firewall 24 are connected to three VLANs whereas the database server 22 is connected to only two VLANs.

Management program 25 can be loaded into management computer 12 from a computer storage medium such as a magnetic disk, CD ROM or DVD 125 or downloaded via the Internet. Likewise, code download program 27 can be loaded into code server 26 from a computer storage medium such as a magnetic disk, CD ROM or DVD 127 or downloaded via the Internet.

The invention claimed is:

1. A method for programming an application computer accessible to a user via a first network to perform a service for the user, said method comprising the steps of:

providing a management computer that includes a management program adapted to configure and reconfigure the application computer, a program code server including a plurality of computer program codes, and a multiport switch for connecting the management computer, the program code server, the application computer and the first network, wherein a first plurality of ports of the multiport switch are assigned to the management computer, a second plurality of ports of the multiport switch are assigned to the application computer, a third plurality of ports of the multiport switch are assigned to the program code server, a fourth plurality of ports of the multiport switch are assigned to the first network;

configuring the multiport switch to form a management VLAN 3 and assigning an "a" port of each of the second and third plurality of ports to the management VLAN 3 by the management program within said management computer such that the application computer and the program code server are connected to the management computer via the management VLAN 3;

configuring the multiport switch to form a VLAN 2 and reassigning the "a" port of the second plurality of ports to the VLAN 2 by the management program within the management computer such that the application computer is connected to the management computer via the VLAN 2;

rebooting the application computer by the management program within the management computer;

configuring the multiport switch to form a download VLAN 1 and reassigning the "a" port of the second plurality of ports to the download VLAN 1 by the management program within the management computer such that the application computer is connected to the program code server via the VLAN 1 and at the same time taking control of the program code server via a management VLAN 3 by the management program within the management computer;

selecting an application program code on the program code server to download and downloading the application program code from the program code server to the application computer via the download VLAN 1 by the management program within the management computer;

reassigning the "a" port of second plurality of ports to VLAN 2 by the management program within the management computer such that the application computer is connected to the management computer via the VLAN 2; and completing configuration of the application computer by the management program within the management computer.

2. A method as set forth in claim 1 further comprising the management computer disabling all other ports of the application computer except the "a" port to connect the application computer only to the management computer on a VLAN 2, the management computer rebooting said application computer by a bootstrap program to configure said application computer with a predefined IP address.

3. A method as set forth in claim 2, wherein after downloading the application program to the application computer, the management computer reassigns the "a" port connected to the application computer so that the application computer is connected only to the management computer and the management computer completes configuring the application computer to provide the service.

4. A method as set forth in claim 1 further comprising the steps of:

connecting another application computer to said multiport switch, assigning another plurality of ports of the multiport switch to the another application computer, the management computer reassigning ports of the multiport switch to form a plurality of VLANs as needed to connect each of the application computers to the management computer and the first network, and to the program code server when downloading another application.

5. A system for programming an application computer accessible to a user via a first network to perform a service for the user, said system comprising:

the application computer;

a program code server including a plurality of application programs;

a dedicated management computer including a management program; and the first network, the application computer, the program code server, the management computer and the first network being operatively connected to a respective plurality of ports of a multiport switch;

the management program within the management computer being adapted to configure the multiport switch to form a first VLAN, assign a first port connected to the application computer to the first VLAN and configure said application computer via said first VLAN to receive an application program to perform the service for the user;

the management program within the management computer being adapted to configure the multiport switch to form a second VLAN, reassign the first port connected to the application computer to the second VLAN such that the second VLAN operatively connects said code server to said application computer, take control of the program code server, perform selection of an application program on the program code server to perform the service for the user, and instruct the program code server to download said application program to said application computer via said second VLAN; and the management program within the management computer being adapted to configure the multiport switch to form a third VLAN and assign a second port connected to the application computer to the third VLAN such that said application computer is operatively connected to said first network to provide said service of said application program for the user via said first network.

6. A system as set forth in claim 5, further comprising said management computer assigns one or more of the plurality of ports of said switch to form said third VLAN.

7. A system as set forth in claim 5, further comprising the management computer operatively connected to the first port connected to the application computer and reboots said application computer by a bootstrap program to configure said application computer with a predefined IP address.

8. A system as set forth in claim 5, further comprising said management computer reassigning the first port connected to the application computer to operatively connect the code server to the application computer to form a second VLAN and said code server to download said application program to said application computer via said second VLAN.

9. A system as set forth in claim 5 further comprising:
the management computer directing said switch to reassign the first port connected to the application computer after the configuring and before the downloading to terminate said first VLAN; and
said management computer directing said switch to reassign the first port connected to the application computer to terminate said second VLAN and directing said switch to reassign the first port connected to the application computer to form said first VLAN to operatively connect the management computer to the application computer and completing the configuration of said first application computer to perform said service.

10. A system as set forth in claim 5 further comprising:
additional application computers operatively connected to said multiport switch, said switch having a respective additional plurality of ports for assignment and reassignment to form a plurality of Virtual Local Area Networks (VLANs) to operatively connect each of said application computers to said code server, management server and first network as needed to download application programs, configure the additional application computers and to perform the service for the user.

11. A system as set forth in claim 5 wherein:
the management computer configures said application computer after said switch forms said first VLAN; and
said code server downloads said computer program to said application computer via said second VLAN after said switch forms said second VLAN.

12. A computer program product for programming an application computer accessible to a user via a first network to perform a service for the user, said computer program product comprising:
a computer readable medium;
first program instructions for execution within a management computer to configure and reconfigure the application computer, a program code server including a plurality of computer program codes, and a multiport switch for connecting the management computer, the program code server, the application computer and the first network, wherein a first plurality of ports of the multiport switch are assigned to the management computer, a second plurality of ports of the multiport switch are assigned to the application computer, a third plurality of ports of the multiport switch are assigned to the program code server, a fourth plurality of ports of the multiport switch are assigned to the first network;
second program instructions for execution within said management computer to configure the multiport switch to form a management VLAN 3 and assign "a" port of each of the second and third plurality of ports to the management VLAN 3 such that the application computer and the program code server are connected to the management computer via the management VLAN 3;
third program instructions for execution within said management computer to configure the multiport switch to form a VLAN 2 and reassign the "a" port of the second plurality of ports to the VLAN 2 such that the application computer is connected to the management computer via the VLAN;
fourth program instructions for execution within said management computer to reboot the application computer;
fifth program instructions for execution with said management computer to configure the multiport switch to form a download VLAN 1 and reassign the "a" port of the second plurality of ports to the download VLAN 1 such that the application computer is connected to the program code server via the VLAN 1 and at the same time taking control of the program code server via the management VLAN 3;
sixth program instructions for execution within said management computer to select an application program code on the program code server to perform the service to download from the program code server to the application computer via the download VLAN 1;
seventh program instructions for execution within said management computer to reassign the "a" port of second plurality of ports to VLAN 2 such that the application computer is connected to the management computer via the VLAN 2: and
eighth program instructions for execution within said management computer to complete configuration of the application computer to provide the service;
wherein said program instructions are stored on said medium.

13. A computer program product as set forth in claim 12 wherein said fourth program instructions reboots said application computer by a bootstrap program in said application program to configure said application computer with at least one predefined IP address.

14. A computer program product as set forth in claim 13, further comprising ninth program instructions for execution within said management computer to direct said code server to download said application program code to said application computer via said download VLAN1.

15. A computer program product as set forth in claim 14 further comprising:
tenth program instructions for execution within said management computer to direct said multiport switch to terminate the VLAN2 after rebooting the application computer and before downloading the application program code to the application computer; and
eleventh program instructions for execution within said management computer to direct said multiport switch to terminate said VLAN3 after downloading the application program code to the application computer and direct said multiport switch to form said VLAN2 before execution of the eighth program instructions to complete the configuration of said application computer to perform said service; and
wherein said tenth and eleventh program instructions are stored on said medium.

16. A computer program product as set forth in claim 14 wherein:
said fourth program instructions configure said application computer after directing said multiport switch to form said VLAN2; and
said ninth program instructions download said application program code to said application computer via said download VLAN1 after said fifth program instructions direct said multiport switch to form said VLAN3.

17. The method as set forth in claim 3, further comprising the management computer, after downloading the application program code and completing configuration of the application computer, assigning the "a" port connected to the application computer to the management VLAN 3, and assigning a "b" port connected to the application computer to the first network so that the application computer can provide the service on the first network.

* * * * *